Dec. 3, 1963  P. HARTMANN ETAL  3,112,677
HYDRODYNAMIC UNIT
Filed Feb. 9, 1962
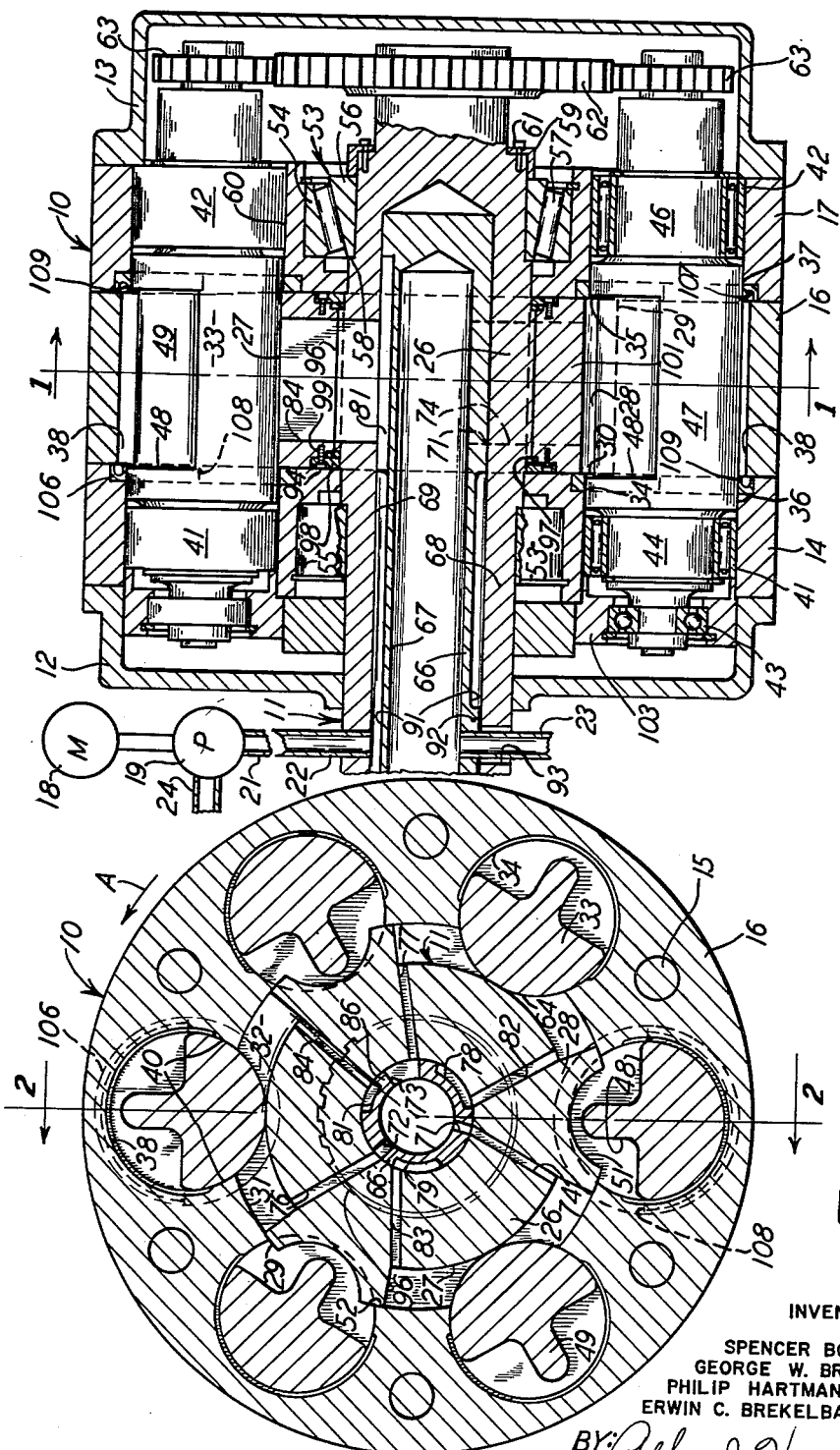
INVENTORS
SPENCER BOWMAN
GEORGE W. BRAND
PHILIP HARTMANN
ERWIN C. BREKELBAUM
BY *Arthur J. Hosmann*
ATTORNEY

United States Patent Office 3,112,677
Patented Dec. 3, 1963

3,112,677
HYDRODYNAMIC UNIT
Philip Hartmann and George W. Brand, Racine, Wis., and Spencer Bowman, Lakewood, and Erwin C. Breckelbaum, Elyria, Ohio, assignors to Hartmann Manufacturing Company, Racine, Wis., a corporation of Wisconsin
Filed Feb. 9, 1962, Ser. No. 172,248
13 Claims. (Cl. 91—81)

This invention relates to a hydrodynamic unit.

A particular application of this invention is in relation to a drive for wheels for various vehicles such as and including tractors, earth-moving equipment, trucks, automobiles and the like. Accordingly, it is an object of this invention to provide an improved hydraulic drive for vehicle wheels.

Another object of this invention is to provide a hydrodynamic unit wherein fluid pressure is directed into the unit and is utilized for converting the pressure to a rotary motion with the unit being arranged to fluid tightly control the fluid pressure therein for maximum efficiency and yet have the unit subjected to a minimum of frictional losses and a minimum of complexity of manufacturing the unit.

Still another object of this invention is to provide a hydrodynamic unit wherein a high torque can be accomplished in a relatively small over-all size of unit so that adequate force can be acquired for heavy work load demands of the unit, and also having the unit so designed that it can operate at an adequate speed of rotation when desired. In conjunction with the latter comment, this particular object is accomplished by providing a selectable means wherein in one position the full effect of the fluid pressure is applied in the unit to produce maximum torque, and wherein in another position of the means, the full effect of a maximum rate of flow of the fluid is utilized to produce maximum speed of rotation in the unit.

Still another object of this invention is to provide a hydrodynamic unit which is designed to withstand considerable loads exerted between a first stator part of the unit and a second rotor part of the unit for supporting loads such as the weight of vehicles or the like, and also to have the unit designed so that it is self-aligning and can be operated to produce the desired relationship between the various moving parts in the nature of "running in" of the parts.

Still another object of this invention in conjunction with its function as a vehicle wheel is to provide the unit wherein maximum torque can be achieved, and wherein maximum speed can also be achieved, and wherein the unit can serve as a brake for the wheel and thereby either stop the wheel or stop the flow of fluid to the wheel so that the fluid pump can supply only the other driving wheel in the event the first wheel is in a condition where it will spin rather than acquire adequate traction for driving.

Other objects and advantages will become apparent upon reading the following description in light of the accompanying drawings wherein:

FIG. 1 is a transverse sectional view through a preferred embodiment of this invention and taken along the line 1—1 of FIG. 2.

FIG. 2 is a longitudinal sectional view taken along the line 2—2 of FIG. 1 and diagrammatically showing the prime mover and pump related thereto.

Since the shown preferred embodiment of this invention is particularly adaptable to a vehicle wheel drive, it will be described in that regard. Thus the drawings show an outer rotor generally designated 10 and an inner stator generally designated 11. The rotor 10 is therefore the inner rotating portion or hub of a vehicle wheel while the stator 11 is the wheel axle about which the rotor 10 rotates in a manner described hereinafter. The rotor 10 is shown to consist of end pieces 12 and 13 and central pieces 14, 16, and 17. Bolts 15 hold pieces 14, 16, and 17 together by extending therethrough and providing alignment. With respect to the stator 11, these pieces 14 and 17 constitute face pieces and 16 constitutes a center piece. These pieces are adequately hollowed or bored for receiving the stator 11 and for receiving the other parts which are described hereinafter.

FIG. 2 shows that the hydrodynamic unit consisting of the rotor 10 and the stator 11 has a prime mover 18 related thereto through a pump 19 which has an outlet 21 connected to the fluid line 22 leading into the stator 11. Thus the motor 18 is of any desired type and may be a gasoline or diesel engine of a vehicle, suitably operating the hydraulic pump 19 for putting fluid pressure into the line 22. Further, the pump 19 is preferably a reversible pump of the variable volume type for a purpose hereinafter apparent. To complete the hydraulic circuit, it will be noted that when the line 22 is used as the inlet to the stator, then a line 23 connected to the stator 11 serves as the exhaust or outlet and this then can be connected to the line 24 on the pump 19. It will therefore be understood that fluid under pressure enters the line 22 and this fluid can flow through certain passageways in the stator 11 to be exerted against the rotor 10 and cause the latter to rotate in the direction of the arrow indicated "A" in FIG. 1. The fluid is then of course exhausted from the stator 11 through the line 23 and returned to the pump 19; reverse flow will reverse rotation of rotor 10.

At this time it will be noted that the stator 11 has an inner portion designated 26 which has an arcuate surface 27 in three spaced-apart locations around the stator 11 and these locations are intermediate vanes 28 which project on the stator 11. Also, face pieces 14 and 17 are fluid tight with the transverse faces 30 and 35 of the stator vanes 28. The vanes 28 also have outer surfaces designated 29 which are arcuate and extend for a length and width hereinafter described so that the vanes 28 seal with the circular wall 31 of the rotor 10. The rotor wall 31 thus defines a bore or chamber designated 32 which receives the portion of the stator 11 just described.

At this time it will also be noted that the rotor 10 has rollers 33 rotatably mounted in the body portions 12–17 of the rotor 10. Further, the rollers 33 are disposed in openings designated 34 in the rotor body portions described and the rollers therefore project into the bore 32 to be in rolling engagement with the stator surfaces 27 when the rollers, for instance, are in the position shown at the top of FIG. 1. It will also be understood that the rollers 33 are in fluid sealing relation with the rotor members 14 and 17 at the areas designated 36 and 37. Still further, in the rotor portion 16, a pocket 38 is provided between the portion 16 and the rollers 33 so that fluid pressure can enter the pocket 38 to provide diametrically opposite fluid balancing on the roller 33 to compensate for the fluid pressure applied to the roller 33 in the chamber or bore 32. Thus when the rotor 10 and rollers 33 move so that, for instance, the upper right-hand rollers 33 of FIG. 1 move to the position of the roller at the top of FIG. 1, fluid pressure in the bore 32 will be placed in the pocket 38 and will therefore be available to counter-balance the pressure acting on the roller at the bore 32, as the roller rotates in fluid-sealing relation with the stator surface 27. Thus the pockets 38 permit fluid pressure to get behind the rollers 33 to counter-balance the high fluid pressure exerted on the rollers 33 when the latter are sealing with the stator 11, and surfaces 40 fluid seal with the rollers 33.

FIG. 2 therefore shows that the rollers 33 are rotatably mounted in the body portion of the rotor 10 by means of the bearings 41 and 42 and 43. The bearings 41 and 42 may therefore be of the size and shape indicated in the upper half of FIG. 2 with the bearings including the usual races which individually surround the ends 44 and 46 of the rollers which have the intermediate portion 47 as shown. Also the rollers 33 have cut-outs or relieved portions 48 so that the rollers can roll over the vanes 28, and the rollers 33 have reinforcing portions or webs 49 for the desired strength of the rollers 33.

At this time it will also be noted that the vanes 28 have cut-outs or openings 51 which receive the roller webs 49 and the vane outer surfaces 52 therefore remain for fluid sealing with the wall 31 as mentioned.

FIG. 2 therefore shows that the width of the stator vane 28 is slightly less than the width of the cut-out or opening 48 so that the roller can pass over the vanes 28 as desired. Still further, it will be noted that a central bearing generally designated 53 is disposed with an outer race 54 rotatable with the rotor and as a part of rotor 10. Thus the pieces 14 and 17 have central openings 55 which receive the bearings 53 like the piece 14 and 17 have openings 60 for receiving the bearings 41 and 42. The inner race 56 is stationary with the stator 11. Thus the bearing roller 57 is disposed between the races for supporting the rotor 10 on the stator 11. This particular bearing can be of any type suitable for supporting the load, but in the instance shown, the angled type of bearing is utilized so that the inner race 56 can be disposed against a shoulder 58 on the stator 11 and an abutment or the like 59 can be drawn by bolts 61 to hold the inner race 56 in position and of course to align the bearing 53 in the usual manner of utilizing that type of bearing.

At this time it will be noted also that the stator has a gear 62 on the end thereof and the rollers 33 have gears 63 on their ends. The gear 62 is of course stationary with the stator 11 and the gears 63 rotates thereover so that the rollers 33 are rotated as they move with the rotor and as a part of the rotor 10. It will also be noted that the gears 63 are slightly smaller than the diameters of the rollers 33 and this therefore produces the desired movement of the rollers 33 including the somewhat scraping action of the roller surfaces 64 against the stator surfaces 27 so that fluid will be tightly held therebetween as desired, and also the parts will actually be run in for better fit if necessary.

With reference to the stator 11, it will be noted that it includes the portion 26 and the shaft or axle portion 68. These portions have a central passageway or bore 67 extending thereto so that the line 23 is in fluid-flow communication with the pasageway 67. Further, it will be noted that the member 66 is disposed within the axle or supporting portion 68 of the stator 11 such that the member 66 constitutes a valve rotatable within the bore 69 of the axle portion 68. Thus the valve 66 has fluid passageways 71 and 72 transversely extending therethrough along with the larger fluid passageway 73. The passageways 71, 72, and 73 are shown in FIG. 1 to be in register with fluid passageways 74, 76, and 77 of the stator portion 26. Thus the line 23 and bore 67 and passageways 71, 72, and 73 and passageways 74, 76, 77 communicate the pump 19 with the rotor bore 32. It will further be noted that the valve or member 66 has relief portions or passageways 78, 79, and 81 extending along the outer circumference of the member 66 and into the stator portion 26. The passageways 78, 79, and 81 are therefore in fluid-flow communication with the stator passageways 82, 83, and 84, and this therefore provides flow communication from the pump 19 to the line 22 and the passageways 78, 79, and 81 and passageways 82, 83, and 84 into the rotor bore 32. With this arrangement complete fluid-flow passageways are provided between the pump 19 and the rotor bore 32 such that fluid can be applied to the bore 32 and it can also of course be exhausted therefrom through the respective passageways described. In actual operation, fluid can therefore be applied through the line 22 and under pressure into the passageways 78, 79, and 81 and from there into the passageways 82, 83, and 84 so that the pressure will be applied against the rollers 33 which are in sealing position with the stator surfaces 27. This pressure therefore causes the rotor to rotate in the direction of the arrow "A."

When the rollers 33 thus move into a non-sealing position with respect to the stator 11, that is the position where the reinforcing webs 49 are radially inward with respect to the center line of the unit, then the fluid pressure that was on one side of the rollers 33 will be permitted to exhaust from the bore 32 through the return passageways defined and connecting with the passageways 74, 76, and 77. With the member or valve 66 being rotatable within the bore 69, it will now be seen that since the pasageways 78 and 79 are slightly larger than the companion passageway 81, and passageways 74 and 82, and 76 and 83, are closer together than the companion passageways 77 and 84, upon rotating the valve 66 clockwise as viewed in FIG. 1, to a position where the passageways 78 and 79 are still in communication with their passageways 74 and 82 and 76 and 83, that is, approximately a 20 degree rotation clockwise, then the passageway 81 still communicates with the passageway 84 but does not communicate with the passageway 77. In this position, the portion 86 of the valve 66 still seals with the bore 69 as do all the cylindrical and projecting portions of the valve 66, however there is no fluid flow between the passageways 77 and 84 because of the sealing portion 86. Thus, fluid pressure coming into the passageway 81 can then go through the passageway 84 which is still in flow communication with the passageway 81, and the pressure will then be applied in the bore 32 against the upper roller 33. The pressure will then also be applied in the passageway 76 when the upper roller 33 moves counter-clockwise beyond the passageway 76 and this pressure can then go into the passageway 79 and into the passageway 83 and so on around the unit until the pressure can return to the exhaust through the passageway 77.

With the arrangement and operation as described in the foregoing, it will therefore be understood that only one of the rollers 33 is effective when the valve 66 is then rotated slightly clockwise and therefore a greater speed to the rotor 10 can be achieved with a given volumetric output of the pump 19. Of course prior to rotating the valve 66 as described, all three of the vanes 28 are effective and in operation so that with the given volumetric output of the pump 19, a greater torque will be applied to the rotor 10, but of course at a lower speed. This is therefore significant where high torque is desired for driving the wheel of the vehicle, for instance, and after the valve 66 is shifted or rotated as described, then a higher speed can be achieved by the rotor 10 and its mounted wheel in that particular embodiment.

In order to apply the fluid from line 22 to the passageways 78, 79, and 81, it is shown that the valve 66 has a relieved circular portion 91 extending therearound in the area of the axle 68 of the stator 11 and this portion of course leads to the passageways 78, 79, and 81 completely around the valve 66. Also, for puurposes of rotating the valve 66 as described, a fluid-sealing portion 92 is provided in the area of the line 23 and a cut-out 93 extends through the axle portion 68 so that the line 23 can move in the rotated motion described with valve 66 and still the portion 92 will seal in the bore 69 so as to avoid leakage from the circular relieved pocket 91.

Still another significant feature with respect to the valve 66 is that the valve can be rotated in counter-clockwise direction from the position shown in FIG. 1 such that the portion 86 aligns with and therefore seals the passageway 84. Also, reversing the output of reversible pump 19 will reverse the drive to the rotor 10. The portion 86 therefore, sealing the passageway 84, provides similar portions of the valve 66 in alignment with the various passageways 76, 83, 74, 82, and 77 so that all of these passageways are sealed from fluid and therefore the particular wheel of the vehicle in that embodiment of the invention is cut off from pressure so that this could serve as a wheel brake for stopping if desired since all fluid within the bore 32 would be trapped therein and the wheel could not turn against the incompressible hydraulic fluid. Also, this is significant if one wheel is spinning because of lack of traction and therefore the entire output of the pump 19 could be aplied to the other wheel if desired, or preferably only a portion of the output of the pump 19 would be applied to the spinning wheel, but the majority of the output would be applied to the other wheel having greater traction as the valve 66 could be used for throttling between full flow and no flow as described.

It will also be noted that the stator axle portion 68 has a spline 96 on the diameter of the stator and extending into the working chamber of the unit, and stator portion 26 is therefore splined over the central portion. FIG. 2 then shows the annular seal 97 applied to the two ends of the spline portions with a washer 98 forced against the seal 97 by means of the bolts 99. In this manner, the spline between the inner part of the portion 26 and the outer part thereof are sealed fluid tight by the annular seals 97 extending therearound. Because of the splined relation, the outer portion 101 of the stator central portion 26 can of course shift along the spline to align itself with the bearings 53 and of course with the openings 48 of the rollers 33 for the desired fit and alignment between these portions.

Rotor portion 103 rotates as a part of the rotor 10 and this displaces the rollers 33, and this portion provides a support for bearings 43.

With respect to the vanes 28 and the roller openings 34, it will therefore be noted in FIG. 1 that the width of the vane is adequate to span the openings 34 along the wall 31 so that the vanes 28 are always sealing with the wall 31, and there will be no fluid leakage between the adjacent passageways 76 and 83 and the other two similar pairs of passageways. Still further, it will be noted that where there are three vanes 28 provided, there are just twice as many rollers 33 provided.

Annular seal members 106 are fixed within the rotor pieces 14 and 17 to encricle each end of each roller 33 as shown. The seals are shown in FIG. 1 on only the top and bottom ones of rollers 33, but would exist on all the rollers, and the seals have a C-shaped cross-section in the radially outer portions thereof so fluid pressure reaching the interiors 107 of the seals 106 will force the side or leg 109 fluid tightly against the roller to fluid seal therewith. The legs 109 extend around the seals between the lines designated 108 so that no fluid will come from the chamber 32 to leak around the rollers 33, through the seals, since the radially inward portions of the seals 106 are thus solid. Since there are twelve rollers ends for potential fluid leakage, seals at these ends are significant.

While a specific embodiment of this application has been shown and described, it should be obvious that certain changes could be made therein and the invention therefore should be determined only by the scope of the appended claims.

What is claimed is:

1. A motor for converting fluid pressure into rotary motion comprising a stator including radially extending vanes and having fluid passageways extending therein on both sides of each of said vanes and extending through said stator to the exterior of said motor, a rotor rotatably mounted on said stator and having a circular chamber for reception of said vanes and having openings on the circumference of the wall of said chamber, rollers rotatably mounted in said openings of said rotor and being in fluid-sealing relation with said rotor and said stator for fluid partitioning between the latter two elements across said chamber and with said rollers having cut-outs for passing over said vanes, and said vanes being of a size to extend along the circumference of said wall to span said openings and fluid seal across the latter.

2. A motor for converting fluid pressure into rotary motion comprising a stator including radially extending vanes and having fluid passageways extending therein on opposite sides of each of said vanes and exteriorly of said motor, a rotor rotatably mounted on said stator and having a circular chamber for reception of said vanes and having openings on the circumference of the wall of said chamber, rollers rotatably mounted in said openings of said rotor and being in fluid-sealing relation with said rotor and said stator for fluid partitioning between the latter two elements across said chamber and with said rollers having cut-outs for passing over said vanes, said vanes being of a size to extend along the circumference of said wall to span said openings and fluid seal across the latter, gears on said stator and said rollers with said gears being in mesh, the diameter of said gears on said rollers being smaller than the diameter of said rollers to effect a rotating wiping action of said rollers on said stator in the direction opposite to that of rotor rotation.

3. A motor for converting fluid pressure into rotary motion comprising a stator including a selected number of radially extending vanes and having fluid passageways extending therein on both sides of each of said vanes and exteriorly of said motor, a rotor rotatably mounted on said stator and having a circular chamber for reception of said vanes and having openings on the circumference of the wall of said chamber in a quantity twice said selected number of said vanes, roller rotatably mounted in each of said openings of said rotor and being in both rotatable synchronization and fluid-sealing relation with said rotor and said stator for fluid partitioning between the latter two elements across said chamber and with said rollers having cut-outs for passing over said vanes, and said vanes each being of a size to extend along the circumference of said wall to span said openings and fluid seal across the latter.

4. A motor for converting fluid pressure into rotary motion comprising a stator including radially extending vanes and having fluid passageways extending therein on opposite sides of each of said vanes and exteriorly of said motor, a rotor rotatably mounted on said stator and including face pieces on opposite sides of said vanes and being fluid tight therewith and having axially aligned openings and said rotor including a center piece having a circular chamber for reception of said vanes and having openings on the circumference of the wall of said chamber, rollers rotatably mounted in all said openings of said rotor and being in fluid sealing relation with said rotor and said stator for fluid partitioning between the latter two elements across said chamber and with said rollers having cut-outs for passing over said vanes, and said vanes being of a size to extend along said wall to span said openings and fluid seal across the latter.

5. A hydrodynamic unit comprising an inner stator and an outer rotor, said rotor having a circular bore therein and said stator including a selected number of rigid vanes disposed in said bore in fluid-sealing relation with the circular wall defining said bore, twice the number of rollers as said selected number being rotatably mounted in said rotor and extending to said stator and being rotatable on portions thereof for fluid sealing therewith, and said stator having fluid passageways extending therethrough from the exterior of said unit and leading to said rotor for admitting and exhausting fluid with respect to said rotor in driving the latter.

6. A hydrodynamic unit comprising an inner stator and an outer rotor, said rotor having a circular bore therein and said stator including a selected number of rigid vanes disposed in said bore in fluid-sealing relation with the circular wall defining said bore, twice the number of rollers as said selected number being rotatably mounted in said rotor and extending to said stator and being rotatable on portions thereof for fluid sealing therewith, said stator having an axial opening therein and fluid passageways extending therethrough in fluid-flow communication with said opening and leading to said bore for admitting and exhausting fluid with respect to said rotor in driving the latter, a valve rotatably mounted in said axial opening and having passageways in register with said fluid passageways of said stator, and means on said valve for rotating the latter to a position for altering registry of said stator passageways with respect to said valve passageways.

7. A hydrodynamic unit comprising an inner stator and an outer rotor, said rotor having a circular bore therein and said stator including a selected number of rigid vanes disposed in said bore in fluid sealing relation with the circular wall defining said bore, twice the number of rollers as said selected number being rotatably mounted in said rotor and extending to said stator and being rotatable on portions thereof for fluid sealing therewith, said stator having fluid passageways extending therethrough from the exterior of said stator and leading to said bore for admitting and exhausting fluid with respect to said rotor in driving the latter, and gears in mesh on said stator and said rollers of a size on the latter less than the diameter of said rollers for rotating the latter slightly faster than a rolling contact with said stator.

8. In a hydrodynamic motor, a center stator and an outer rotor rotatably mounted thereover, said stator including radially projected vanes and said rotor having a bore for receiving said vanes, said stator having fluid passageways extending therethrough from the exterior of said motor and into and out of said rotor for rotatably driving the latter, a circumferential outer portion of said stator including said vanes and being splined onto the remaining circumferential inner portion of said stator for axial displacement of said outer portion on said inner portion to adjust to said rotor bore, and fluid sealing means on said stator for making the spline fluid tight.

9. A hydrodynamic unit comprising an inner stator and an outer rotor, said rotor having a circular bore therein and said stator including a plurality of rigid vanes disposed in said bore in fluid-sealing relation with the circular wall defining said bore, rollers rotatably mounted in said rotor and extending to said stator and being rotatable on portions thereof for fluid sealing therewith, said stator having a pair of fluid passageways adjacent each of said vanes and extending through said stator and leading to said rotor for admitting and exhausting fluid with respect to said rotor in driving the latter, and a valve movable in said stator and having fluid passageways in respective register with said pairs of fluid passageways and with at least one of said valve passageways extending into registry with at least one of said pairs of fluid passageways upon movement of said valve for fluid flow past at least one of said vanes for selectively applying fluid against only certain ones of said rollers.

10. A motor for converting fluid pressure into rotary motion comprising a stator including radially extending vanes and having fluid passageways extending therein on opposite sides of each of said vanes, a rotor rotatably mounted on said stator and having a circular chamber for reception of said vanes and having openings on the circumference of the wall of said chamber, rollers rotatably mounted in said openings of said rotor and being in fluid- sealing relation with said rotor and said stator for fluid partitioning between the latter two elements across said chamber and with said rollers having cut-outs for passing over said vanes, and a valve movably disposed in said stator and having inlet and outlet fluid passageways therein in registry with said stator passageways, said valve and said passageways therein being arranged with said inlet extending across two of said stator passageways upon first selective movement of said valve, and with said valve including fluid-sealing portions alignable with said stator passageways for interrupting fluid flow therethrough upon second selective movement of said valve.

11. A motor for converting fluid pressure into rotary motion comprising a stator including radially extending vanes and having fluid passageways extending therein on opposite sides of each of said vanes, a rotor rotatably mounted on said stator and having a circular chamber for reception of said vanes and having openings on the circumference of the wall of said chamber, rollers rotatably mounted in said openings of said rotor and being in fluid-sealing relation with said rotor and said stator for fluid partitioning between the latter two elements across said chamber and with said rollers having cut-outs for passing over said vanes, fluid seals disposed in said housing in fluid-sealing relation with the ends of said rollers, and said vanes being of a size to extend along said wall to span said openings and fluid seal across the latter.

12. A motor for converting fluid pressure into rotary motion comprising a stator including radially extending vanes and having first fluid passageways extending therein on both sides of each of said vanes and said stator having two additional fluid passageways in fluid-flow communication with said first fluid passageways, a rotor rotatably mounted on said stator and having a circular chamber for reception of said vanes and having openings on the circumference of the wall of said chamber, rollers rotatably mounted in said openings of said rotor and being in fluid-sealing relation with said rotor and said stator for fluid partitioning between the latter two elements across said chamber and with said rollers having cut-outs for passing over said vanes, and valve means rotatable in said stator and disposed intermediate said first fluid passageways and said additional fluid passageways and adapted for selective positioning to control flow of fluid between all said passageways.

13. A motor for converting fluid pressure into rotary motion comprising a stator including radially extending vanes and having first fluid passageways extending therein on opposite sides of each of said vanes and said stator having two additional fluid passageways movably disposed therein and being respectively selectively fluid-flow communicable with selected ones of said first fluid passageways and including being selectively fluid-flow communicable with said first fluid passageways on said opposite sides of said vanes, a rotor rotatably mounted on said stator and having a circular chamber for reception of said vanes and having openings on the circumference of the wall of said chamber, and rollers rotatably mounted in said openings of said rotor and being in fluid-sealing relation with said rotor and said stator for fluid partitioning between the latter two elements across said chamber and with said rollers having cut-outs for passing over said vanes.

References Cited in the file of this patent

UNITED STATES PATENTS

| 1,717,739 | Seifert | June 18, 1929 |
| 2,244,830 | Doe et al. | June 10, 1941 |
| 2,690,164 | Skok | Sept. 28, 1954 |

FOREIGN PATENTS

| 79,657 | Sweden | Nov. 18, 1931 |